(12) United States Patent
Waldburger

(10) Patent No.: US 9,049,837 B2
(45) Date of Patent: Jun. 9, 2015

(54) CHEESE MOULD

(71) Applicant: KALT MASCHINENBAU AG, Lütisburg (CH)

(72) Inventor: Peter Waldburger, Niederbüren (CH)

(73) Assignee: KALT MASCHINENBAU AG, Lütisburg (CH)

( * ) Notice: Subject to any disclaimer, the term of this patent is extended or adjusted under 35 U.S.C. 154(b) by 5 days.

(21) Appl. No.: 14/031,784

(22) Filed: Sep. 19, 2013

(65) Prior Publication Data

US 2014/0087014 A1    Mar. 27, 2014

(30) Foreign Application Priority Data

Sep. 21, 2012   (CH) ...................................... 1712/12

(51) Int. Cl.
  *A01J 25/13*    (2006.01)
(52) U.S. Cl.
  CPC ...................................... *A01J 25/13* (2013.01)
(58) Field of Classification Search
  CPC ............................................................ A01J 25/13
  USPC .......................................................... 425/84
  See application file for complete search history.

(56) References Cited

U.S. PATENT DOCUMENTS

| | | |
|---|---|---|
| 5,206,496 A | 4/1993 | Clement et al. |
| 5,794,779 A | 8/1998 | Weinheimer et al. |
| 7,757,876 B1 | 7/2010 | Ditter |
| 8,512,792 B2 * | 8/2013 | Spijkerman ................... 426/582 |
| 2010/0239730 A1 * | 9/2010 | Ditter ........................... 426/389 |

FOREIGN PATENT DOCUMENTS

| | | |
|---|---|---|
| DE | 1030612 B | 5/1958 |
| DE | 2823182 A1 | 12/1978 |
| DE | 19613068 A1 | 10/1997 |
| EP | 350777 A1 | 1/1990 |
| EP | 406899 A1 | 1/1991 |
| EP | 543899 A1 | 6/1993 |
| EP | 1269832 B1 | 10/2004 |
| GB | 951746 A | 3/1964 |

OTHER PUBLICATIONS

Derwent Abstract of FR2981827 (Oct. 28, 2011).*

* cited by examiner

*Primary Examiner* — Dimple Bodawala
*Assistant Examiner* — Robert J Grun
(74) *Attorney, Agent, or Firm* — Paul D. Bianco; Martin Fleit; Fleit Gibbons Gutman Bongini & Bianco PL

(57) ABSTRACT

The invention provides a cheese mold, in particular a cheese mold composed of plastic or metal, for arrangement in a cassette press or the like. The mold should have a simple structure, and at the same time withstand the pressing pressure and also satisfy high hygienic demands. This is advantageously achieved in that the base of the mold is provided with a rib structure as far as the transition region of the outer jacket wall, wherein the mold can be round or cylindrical or angular in cross section. In the case of a round mold, longitudinal ribs extend radially, starting from the longitudinal axis over the base and continuously as jacket ribs into the region of the jacket wall.

11 Claims, 4 Drawing Sheets

CHEESE MOULD

CROSS REFERENCE TO RELATED APPLICATION

This application claims priority under 35 U.S.C. §119 to Swiss Patent Application No. CH-01712/12 filed 21 Sep. 2012, the entire contents of which are incorporated herein by reference.

FIELD OF THE INVENTION

The invention relates to a cheese mould, in particular a cheese mould consisting of plastic or metal, having a round or polygonal cross section, for arrangement in a cassette press or the like.

BACKGROUND OF THE INVENTION

A device for the industrial production of cheese blocks is known e.g. from EP-A-350777. This comprises a wash-in press having a rectangular trough, which is open at the top, for receiving moulds, a frame for arranging a press head, which can be lowered and raised, and a distribution head for feeding and metering the raw cheese mass into the moulds, and a gantry carriage for guiding the distribution head and handling a turning mechanism for the moulds. The distribution head and the turning mechanism must be provided and changed manually. The wall of the mould consists of a perforated plate and several moulds can be arranged in sets. At the end faces of a set, cylindrical pins are provided for docking a handling apparatus.

EP-A-406899 discloses a development of such a device, in which the moulds are accommodated in cassettes, which are in turn arranged in a compact manner in rows in the trough. Provided above the moulds is a press head with press dies directed at the moulds for pressing the raw cheese mass.

The actual press mould is surrounded by a pot-shaped jacket with an air supply duct (EP-B-1269832). An air duct is thereby formed, and the cheese mass adhering to the screen holes of the perforated plate of the mould can be detached from the mould side after pressing by the supplied air.

A further cheese mould with a perforated metal mould wall is disclosed in DE-B-1030612. This mould wall has on its inner surface uniformly distributed, low raised portions and depressions up to approx. 1 mm, which should not damage the cheese rind when the cheese block is removed, even if the cheese is knocked out of the mould.

According to DE-C-2823182, such a cheese mould with a perforated wall can also consist of plastic, on the inner side of which parallel grooves with a triangular cross section are provided. In the transitional and integral base region, the grooves are separated by ribs with interruptions.

Such mould walls or double bases are time-consuming to clean.

A multi-functional container for folding boxes (DE-A-19613068) has a cover plate, which rests on the folding boxes and is reinforced with ribs. The underside of the container base is provided with corrugated ribs. However, there is no connection to cheese moulds.

SUMMARY OF THE INVENTION

An aspect of the invention is based on developing a cheese mould, in particular a cheese mould consisting of metal or plastic for arrangement in a cassette press or the like, which has a simple structure and withstands the high pressing pressure as well as satisfying high hygiene demands.

The wall of the cheese mould is integral and preferably provided with a rib structure on the outer wall in the transitional and base region.

The strength and stability of the cheese mould are increased, and the base can be checked visually, in particular with regard to hygiene and cleaning. The previously customary double wall of the base can thereby be omitted, which also makes it possible to dispense with the injection of air to detach the cheese block.

Preferred configurations are disclosed herein. The rib structure can be applied to both round and angular moulds, with corresponding adaptations.

In the case of round cheese moulds, individual ribs extend preferably radially starting from the longitudinal axis of the cheese mould, over the base, into the region of the jacket wall or else as far as the upper edge of the jacket wall. The ribs are preferably coupled in the base region by transverse ribs arranged in a ring-shaped manner, it being possible for a plurality of rings with different diameters to be provided spaced apart from each other.

In the case of rectangular cheese moulds, ribs are arranged at least parallel to each other, it being possible for further, transverse ribs, which are likewise parallel to each other, to be provided transversely thereto.

The ribs are dimensioned in such a manner that the outer dimensions of existing cassettes for receiving cheese moulds can remain unchanged.

At least the jacket of the cheese mould consists of a perforated plate, which can additionally have a whey edge with a coarser perforation.

BRIEF DESCRIPTION OF THE DRAWINGS

The invention is described in more detail below in an exemplary embodiment. In the drawing.

DETAILED DESCRIPTION

Figure 1:
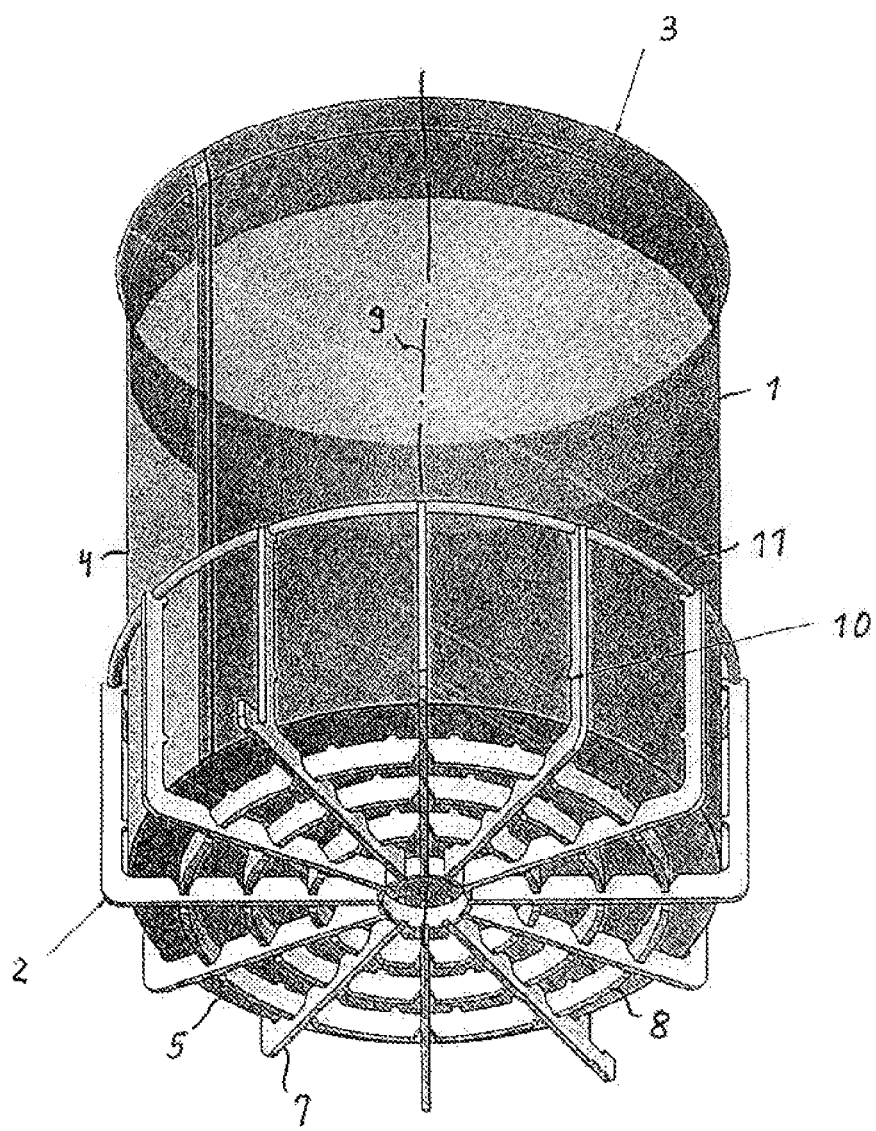
FIG. 1: shows a round cheese mould according to the invention.

Moulds 1, 12 according to the invention (cheese moulds) consisting of metal, in particular a stainless steel, pass into known cassette presses for use. Such a cassette press is used in a manner known per se for liquid-reducing pressing of raw cheese mass and comprises

- a trough, which is rectangular when viewed from above and open at the top, having cassettes, which are rectangular when viewed from above and open at the top, and are arranged next to each other in rows transversely to the longitudinal direction of the trough,
- round or angular moulds 1, 12 for receiving the raw cheese mass to be pressed, which are arranged in the cassettes 6 and have at least one base 5 and a jacket 4 having at least one outlet for the liquid to be pressed out, wherein one cassette 6 comprises at least one mould 1, 12, and at least the base 5 of the mould 1, 12 is provided with a rib structure 2, and wherein a mould 1, 12 can be part of the cassette 6,
- a press head mounted on end columns and having a multiplicity of press dies, which are directed at the moulds 1, for pressing the raw cheese mass, e.g. configured according to the disclosure of EP-B-543899, as well as holders where necessary for pressing the press head off the cassettes, a pipe distribution system or a filling machine for pouring the raw cheese mass into the moulds 1, 12, at least one handling apparatus, which can be moved in a motorised manner along the longitudinal sides of the trough, for lifting, moving and placing a cassette 6 on a conveyor apparatus outside the trough, an apparatus for rotating/turning the cassette 6 or the row of cassettes about their longitudinal axis.

The cassette press can preferably also be assigned a spring-mounted shaker, which is arranged horizontally above the conveyor apparatus, in the form of a clamping frame for receiving a cassette 6, which is provided with unbalance motors. The cheese blocks are only emptied onto the conveyor apparatus after shaking.

A round mould 1 according to FIG. 1 comprises a cylindrical jacket 4 having an upper basket 3 and a base 5, which is provided with a rib structure 2 as far as the transition region of the outer jacket wall.

Longitudinal ribs 7 extend radially, starting from the longitudinal axis 9 over the base 5 and continuing as jacket ribs 10 into the region of the jacket wall. The ends of the jacket ribs 10 are welded to a jacket ring 11. The longitudinal ribs 7 are connected in a material and/or form-fitting manner to rings 8 in the base region, a plurality of rings 8 having different diameters being provided at a distance from each other. An inner ring 8 delimits the extent of the longitudinal ribs 7 towards the longitudinal axis 9.

Figure 2:
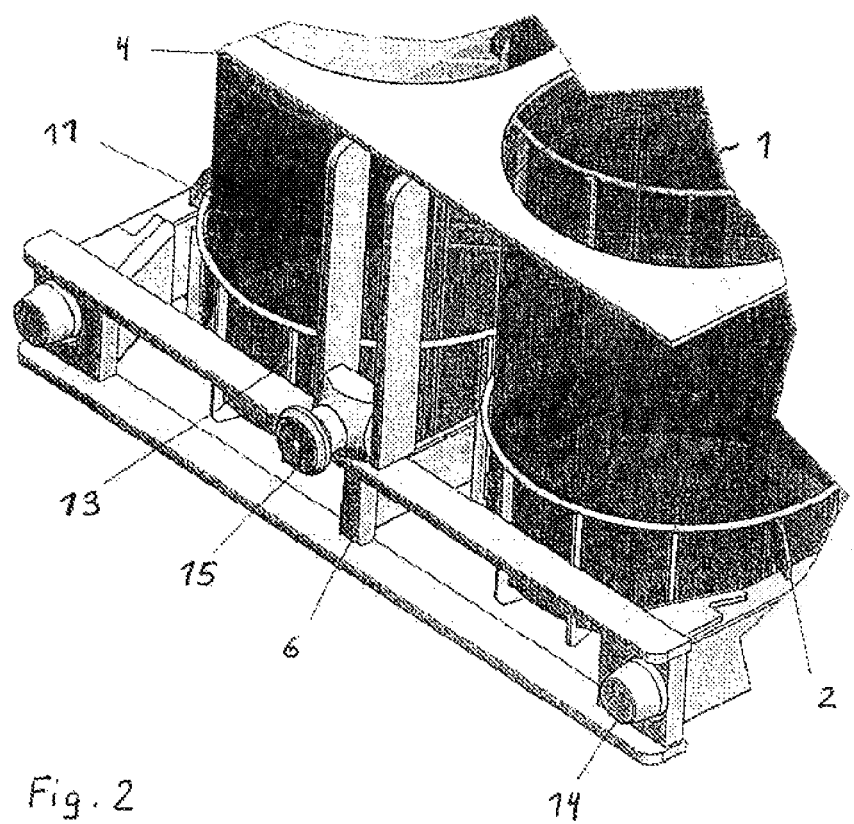
FIG. 2: shows a round cheese mould in a cassette (detail)
Figure 3:
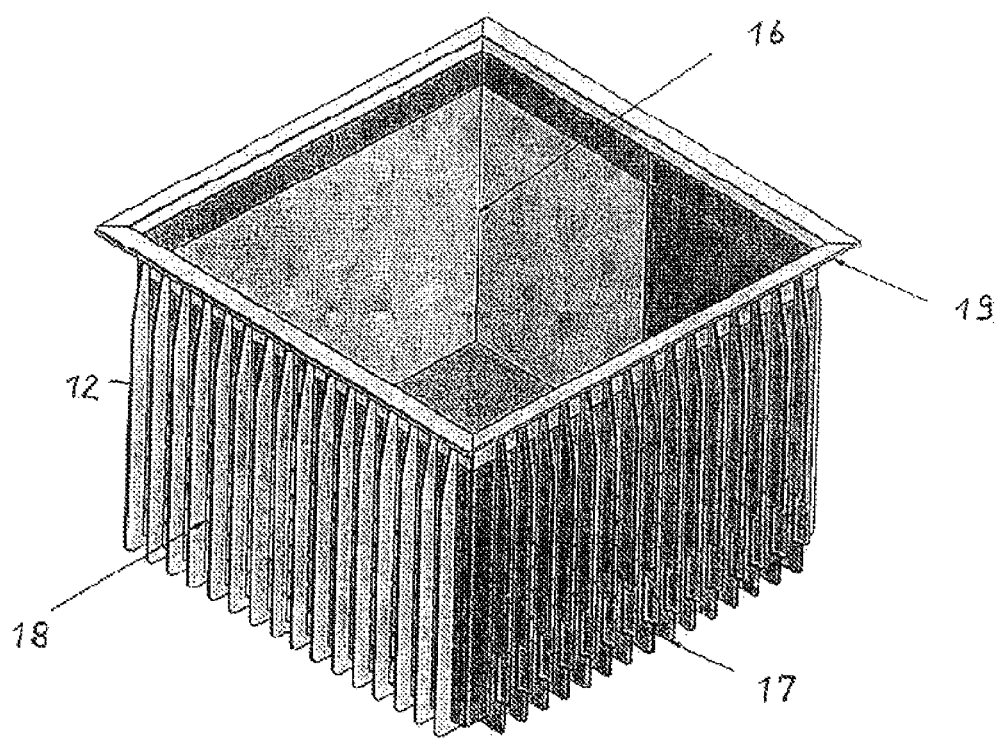
FIG. 3: shows a rectangular cheese mould according to the invention.

The individual moulds 1 are arranged in a manner known per se in the base region of cassettes 6 (FIG. 2). A cassette 6 consists at least of a frame, which consists of struts 13 on which are provided drive centring pins 15 for receiving and turning the cassette 6 and centring pins 14 for the trough and clamping frame.

Rectangular moulds 12, however, have longitudinal and jacket ribs 17, 18, which are preferably arranged parallel to each other, further longitudinal and jacket ribs 17, 18, which are likewise arranged parallel to each other, being provided transversely thereto.

The jacket ribs 18 can extend to a basket 19 forming the upper edge of the jacket 16. The mould 12 can however also be formed without the basket 19.

In the case of both round and angular moulds 1, 12, the ribs can be connected to the jacket and base by spot welding. To this end, the ribs then have projecting noses, and spot welding is carried out at each nose. Despite the integral base and jacket, the moulds have high strength, in particular for absorbing the pressing forces.

The ribs are dimensioned in such a manner that the outer dimensions of existing cassettes for receiving moulds can remain unchanged.

At least the jacket 4, 16 of the cheese mould consists of a perforated plate. The perforations must satisfy the condition that the outflow of whey must be less than the inflow of raw cheese mass. Only in this manner can it be ensured that the curds are always below the top of the whey. Only in this manner can air pockets in the cheese be prevented.

For cheese to be pressed greatly, i.e. hard cheese, the jacket wall and where necessary also the base consist of Conidur® finely perforated plate. As a result of the specific perforation, the formation of "hair", as occurs in plastic moulds or normal, thicker perforated plates, can be avoided.

For the compression of soft cheese or semi-hard cheese, however, a conventional perforation can be sufficient.

The perforated plate can have a whey edge 20 having a coarser perforation than the rest of the jacket 4, 16 underneath the basket 3, in particular for producing hard cheese. Different perforations in the jacket 4, 16 are not absolutely necessary for softer cheese.

Figure 4:
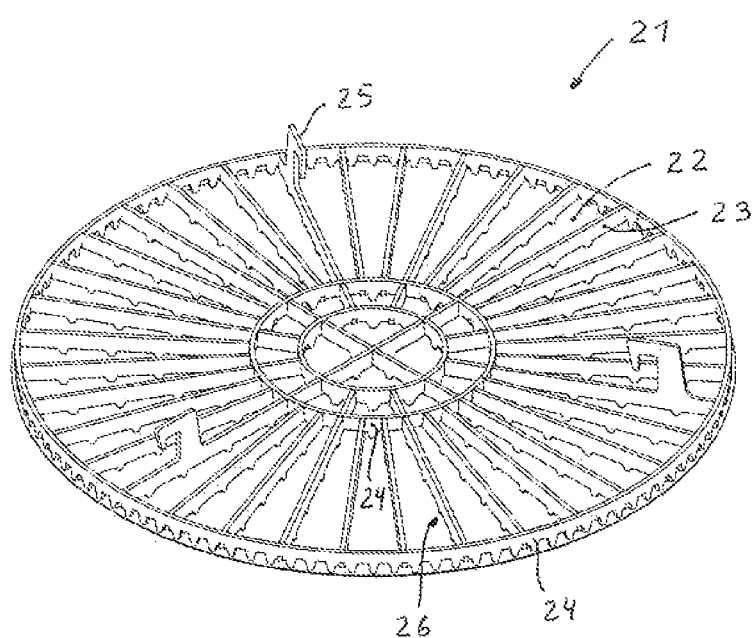
FIG. 4: a press cover for a cheese mould according to FIG. 1.

A press cover 21 according to the invention (FIG. 4) for a round cheese mould 1 consists of a perforated plate 22, preferably a finely perforated plate, for example consisting of Conidur®, which corresponds in shape and dimensions to the inner cross section of the cheese mould 1, and a reinforcing rib structure 23, 24 situated thereon, consisting of stainless steel, which gives the press cover 21 the necessary rigidity for pressing out the whey. The rib structure 23, 24 is connected in a non-detachable manner, in particular welded, to the perforated plate 22 by thin webs 26.

In the case of the round cheese mould 1, individual ribs extend in the form of struts 23 over the central point preferably radially starting from the longitudinal axis of the mould over the perforated plate 22 to the circumference. They then cross rings or transverse ribs 24 arranged in an annular manner and are connected with them at the intersection points, it being possible for several rings with different diameters to be provided at a distance from each other.

The cheese moulds can in principle also consist of a plastic.

All references cited herein are expressly incorporated by reference in their entirety. In addition, unless mention was made above to the contrary, it should be noted that all of the accompanying drawings are not to scale. There are many different features to the present invention and it is contemplated that these features may be used together or separately. Thus, the invention should not be limited to any particular combination of features or to a particular application of the invention. Further, it should be understood that variations and modifications within the spirit and scope of the invention might occur to those skilled in the art to which the invention pertains. Accordingly, all expedient modifications readily attainable by one versed in the art from the disclosure set forth herein that are within the scope and spirit of the present invention are to be included as further embodiments of the present invention.

LIST OF REFERENCE SYMBOLS

1 Cheese mould
2 Rib structure
3 Basket
4 Jacket
5 Base
6 Cassette
7 Longitudinal rib
8 Ring
9 Longitudinal axis
10 Jacket rib
11 Jacket ring
12 Cheese mould
13 Strut
14 Centring pin
15 Drive centring pin
16 Jacket
17 Longitudinal rib
18 Jacket rib
19 Basket
20 Whey edge
21 Press cover
22 Perforated plate
23 Strut
24 Transverse rib, ring 25 Eyelet
26 Web

The invention claimed is:

1. A cheese mould for arrangement in a cassette press, the cheese mould comprising at least: a base; a jacket; and a rib structure disposed on the base, wherein the rib structure comprises comprising a plurality of radial ribs extending radially outward from the base and transitioning over the base into jacket ribs disposed on a wall of the jacket, the plurality of radial ribs connected to a plurality of concentric rings disposed on the base, the plurality of concentric rings having different diameters being provided at a distance from each other.

2. The cheese mould according to claim 1, wherein the cheese mould comprises at least one of plastic and metal.

3. The cheese mould according to claim 1, wherein the cheese mold comprises a round configuration.

4. The cheese mould according to claim 1, wherein an inner concentric ring of the plurality of concentric rings delimits an extent of the radial ribs, and wherein an end portion of the jacket ribs are connected to a jacket ring.

5. The cheese mould according to claim 1, wherein the cheese mould comprises a press cover, the press cover comprising a perforated plate, wherein the perforated plate corresponds in shape and dimension to an inner cross section of the cheese mould, wherein the press cover further comprises a reinforcing rib structure.

6. The cheese mould according to claim 5, wherein the reinforcing rib structure comprises ribs configured as struts, that run over a central point radially starting from a longitudinal axis of the cheese mould over the perforated plate to a circumference of the cheese mould, wherein at least one of cross rings and transverse ribs are arranged in an annular configuration and are connected reinforcing ribs at intersection points, and wherein a plurality of rings with different diameters are provided at a distance from each other.

7. The cheese mould according to claim 5, wherein the perforated plate is a finely perforated plate, and wherein the reinforcing rib structure is formed from metal.

8. The cheese mould according to claim 5, wherein the reinforcing rib structure is non-detachably connected to the perforated plate by thin webs.

9. The cheese mould according to claim 1, wherein at least the jacket comprises a perforated plate.

10. The cheese mould according to claim 9, wherein the perforated plate is a finely perforated plate.

11. The cheese mould according to claim 5, wherein the perforated plate comprises a whey edge having a coarser perforation than a perforation of a remaining portion of the jacket under a basket portion of the jacket.

* * * * *